(12) United States Patent
Nomura et al.

(10) Patent No.: US 7,742,237 B2
(45) Date of Patent: Jun. 22, 2010

(54) LENS BARRIER MECHANISM OF A LENS BARREL

(75) Inventors: Hiroshi Nomura, Saitama (JP); Tatsuya Ohyama, Saitama (JP)

(73) Assignee: Hoya Corporation, Tokyo (JP)

( * ) Notice: Subject to any disclaimer, the term of this patent is extended or adjusted under 35 U.S.C. 154(b) by 25 days.

(21) Appl. No.: 12/488,614

(22) Filed: Jun. 22, 2009

(65) Prior Publication Data

US 2009/0323188 A1 Dec. 31, 2009

(30) Foreign Application Priority Data

Jun. 27, 2008 (JP) ............................. 2008-168325

(51) Int. Cl.
*G02B 15/14* (2006.01)
(52) U.S. Cl. ..................... 359/694; 359/700; 359/701
(58) Field of Classification Search ................. 359/694, 359/700, 701, 819, 822, 823, 826
See application file for complete search history.

(56) References Cited

U.S. PATENT DOCUMENTS

| 5,170,294 | A | 12/1992 | Haraguchi et al. |
| 5,659,810 | A | 8/1997 | Nomura et al. |
| 7,088,524 | B2 | 8/2006 | Nomura et al. |
| 2009/0231731 | A1 | 9/2009 | Sasaki |
| 2009/0231732 | A1 | 9/2009 | Sasaki |
| 2009/0232485 | A1 | 9/2009 | Sasaki |
| 2009/0257137 | A1* | 10/2009 | Yamano ..................... 359/817 |

FOREIGN PATENT DOCUMENTS

JP 2000-292670 10/2000

OTHER PUBLICATIONS

U.S. Appl. No. 12/263,694 to Nomura et al., which was filed on Nov. 3, 2008.
U.S. Appl. No. 12/263,710 to Nomura et al., which was filed on Nov. 3, 2008.
English language Abstract of JP 2000-292670, Oct. 20, 2000.
English language machine translation of JP 2000-292670, Oct. 20, 2000.

* cited by examiner

*Primary Examiner*—Timothy J Thompson
(74) *Attorney, Agent, or Firm*—Greenblum & Bernstein, P.L.C.

(57) ABSTRACT

A lens barrier mechanism of a lens barrel includes a cam ring including a forward-projecting portion; a linearly movable barrel provided outside the cam ring and moves linearly by rotating the cam ring; a barrier blade provided in the linearly movable barrel and movable in an operating plane orthogonal to the optical axis to open and close an opening at the front of the linearly movable barrel; and a barrier drive mechanism which opens and shuts the barrier blade when the lens barrel moves from/to the accommodated state to/from the ready-to-photograph state, respectively. A range of opening/shutting operation of the barrier blade extends radially outside an inner periphery of the forward-projecting portion. In the accommodated state, the forward-projecting portion intersects the operating plane of the barrier blade but is positioned outside the range of opening/shutting operation of the barrier blade.

9 Claims, 13 Drawing Sheets

LENS BARRIER MECHANISM OF A LENS BARREL

BACKGROUND OF THE INVENTION

1. Field of the Invention

The present invention relates to a lens barrier mechanism incorporated in a lens barrel.

2. Description of the Related Art

Lens barrels (photographic lenses) of compact cameras are generally provided with a lens barrier mechanism for shutting the front of a photographing optical system in an accommodated state (retracted state) of the lens barrel when no pictures are taken. As described in Unexamined Japanese Patent Publication 2000-292670, a mechanism for controlling opening/shutting operations of a set of barrier blades (e.g., sector blades) of such a lens barrier mechanism via a cam ring used for driving lens groups is known in the art.

In this type of lens barrier mechanism, the barrier blades are shut by a spring biasing force and the barrier blades are opened by applying a force against the spring biasing force. Accordingly, in a lens barrel accommodated state, it is conventionally the case that any movable member such as a cam ring is prevented from entering into an operating plane in which the set of barrier blades opens and shuts to prevent the set of barrier blades from interfering with other members. However, to achieve a reduction in length of the lens barrel, the lens barrier mechanism has also been required to achieve a further improvement in efficiency of space utilization.

SUMMARY OF THE INVENTION

The present invention provides a lens barrier mechanism which is superior in efficiency of space utilization, and which contributes to a reduction in thickness of the lens barrel equipped with the lens barrier mechanism when the lens barrel is in a lens barrel accommodated state.

The present invention has been devised in view of the findings that some spaces which do not overlap the barrier blade or blades exist even in the operating plane in which the barrier blade or blades open and shut, and that there is still room for improvement in accommodation efficiency by utilizing such spaces.

According to an aspect of the present invention, a lens barrier mechanism, of a lens barrel movable between a ready-to-photograph state and an accommodated state in which no pictures can be taken, is provided, the lens barrier mechanism including a cam ring which rotates when the lens barrel moves between the ready-to-photograph state and the accommodated state, wherein the cam ring includes a cylindrical portion on which at least one cam groove is formed, and at least one forward-projecting portion which projects forward in an optical axis direction from the cylindrical portion; a linearly movable barrel provided outside the cam ring, the linearly movable barrel being moved linearly in the optical axis direction by rotation of the cam ring while being guided by the cam groove; at least one barrier blade supported by the linearly movable barrel to be movable in an operating plane orthogonal to the optical axis so as to open and close an opening formed at the front of the linearly movable barrel; and a barrier drive mechanism which opens the barrier blade when the lens barrel moves from the accommodated state to the ready-to-photograph state and shuts the barrier blade when the lens barrel moves from the ready-to-photograph state to the accommodated state. A range of opening/shutting operation of the barrier blade extends radially outside a position of an inner periphery of the forward-projecting portion in a radial direction of the lens barrel with respect to the optical axis. When the lens barrel is in the accommodated state, the forward-projecting portion intersects the operating plane of the barrier blade, and the forward-projecting portion is positioned outside the range of opening/shutting operation of the barrier blade in the operating plane.

It is desirable for the linearly movable barrel to include a flange portion provided rearward from the barrier blade in the optical axis direction, wherein, when the lens barrel is in the ready-to-photograph state, the forward-projecting portion of the cam ring is positioned behind the flange portion in the optical axis direction. When the lens barrel moves from the ready-to-photograph state to the accommodated state, the forward-projecting portion of the cam ring relatively moves through a through-hole, which is formed through the flange portion, so that said forward-projecting portion intersects the operating plane.

It is desirable for the linearly movable barrel to include a front wall portion positioned in front of the barrier blade in the optical axis direction, and for the front wall portion to cover the front of the forward-projecting portion that is relatively moved to a position so as to intersect the operating plane in the accommodated state of the lens barrel.

It is desirable for part of the cam groove to be formed on the forward-projecting portion of the cam ring. Accordingly, the cam groove can be arranged in a space-saving manner, and the cam ring can be miniaturized.

It is desirable for a plurality of the forward-projecting portions to be formed at different positions in a circumferential direction of the cam ring, and for all of the forward-projecting portions to be positioned outside the range of opening/shutting operation of the barrier blade in the operating plane when the lens barrel is in the accommodated state.

It is desirable for the barrier drive mechanism to include a shutting-direction biasing spring which biases the barrier blade in a direction to close the opening at front of the linearly movable barrel, and a barrier drive ring which is supported by the linearly movable barrel to be rotatable in a plane substantially parallel to the operating plane of the barrier blade. The barrier drive ring opens and holds the barrier blade against a biasing force of the shutting-direction biasing spring when the lens barrel is in the ready-to-photograph state. When the lens barrel moves from the ready-to-photograph state to the accommodated state, the barrier drive ring is pressed and rotated by the forward-projecting portion to thereby release the holding of the barrier blade.

It is desirable for the range of opening/shutting operation of the barrier blade to extend in a radial direction beyond a position of an inner circle defined by an inner periphery of the plurality of forward-projecting portions as viewed along the optical axis.

It is desirable for the barrier drive mechanism to further include an extension spring which biases the barrier drive ring in a direction to open the barrier blade, a spring force of the extension spring being greater than that of the shutting-direction biasing spring.

It is desirable for a plurality of the cam grooves which correspond in number to the plurality of forward-projecting portions to be partly formed on the plurality of forward-projecting portions, respectively.

According to the present invention, the forward-projecting portion of the cam ring relatively moves (advances) to a position in the optical axis direction which is coincident with the position of the barrier blade in the optical axis direction when operating the barrier drive mechanism, which improves the efficiency of space utilization in the optical axis direction and makes it possible to achieve a further reduction in length of the lens barrel in the accommodated state thereof. In addition, since the forward-projecting portion of the cam ring at this time is positioned outside the range of opening/shutting operation of the barrier blade, the forward-projecting portion does not interfere with the barrier blade, so that reliable operation of the barrier blade is ensured.

The present disclosure relates to subject matter contained in Japanese Patent Application No. 2008-168325 (filed on Jun. 27, 2008) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
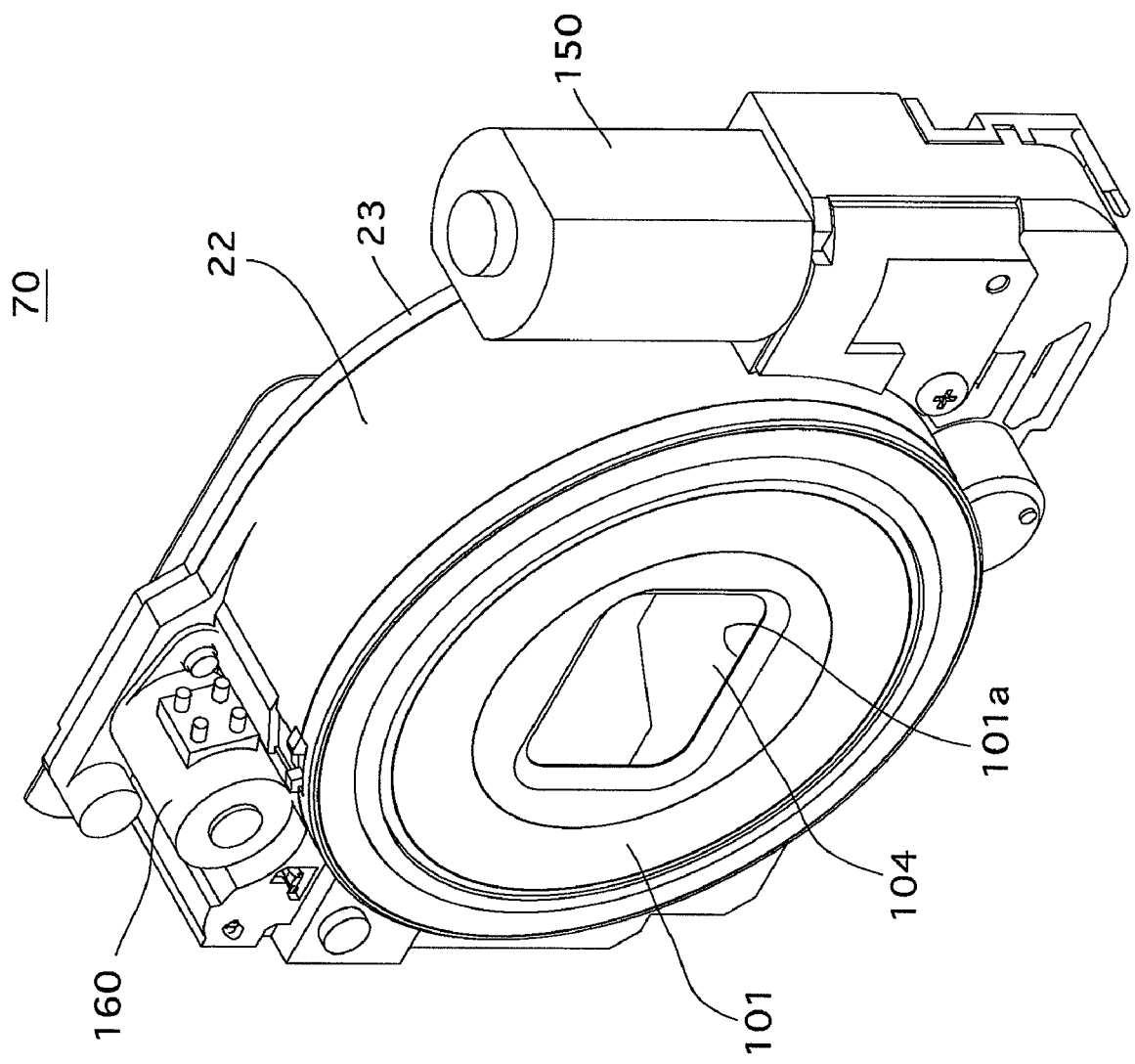
FIG. 1 is an external perspective view of a zoom lens barrel according to the present invention when the zoom lens barrel is in an accommodated state (fully retracted state)
Figure 2:
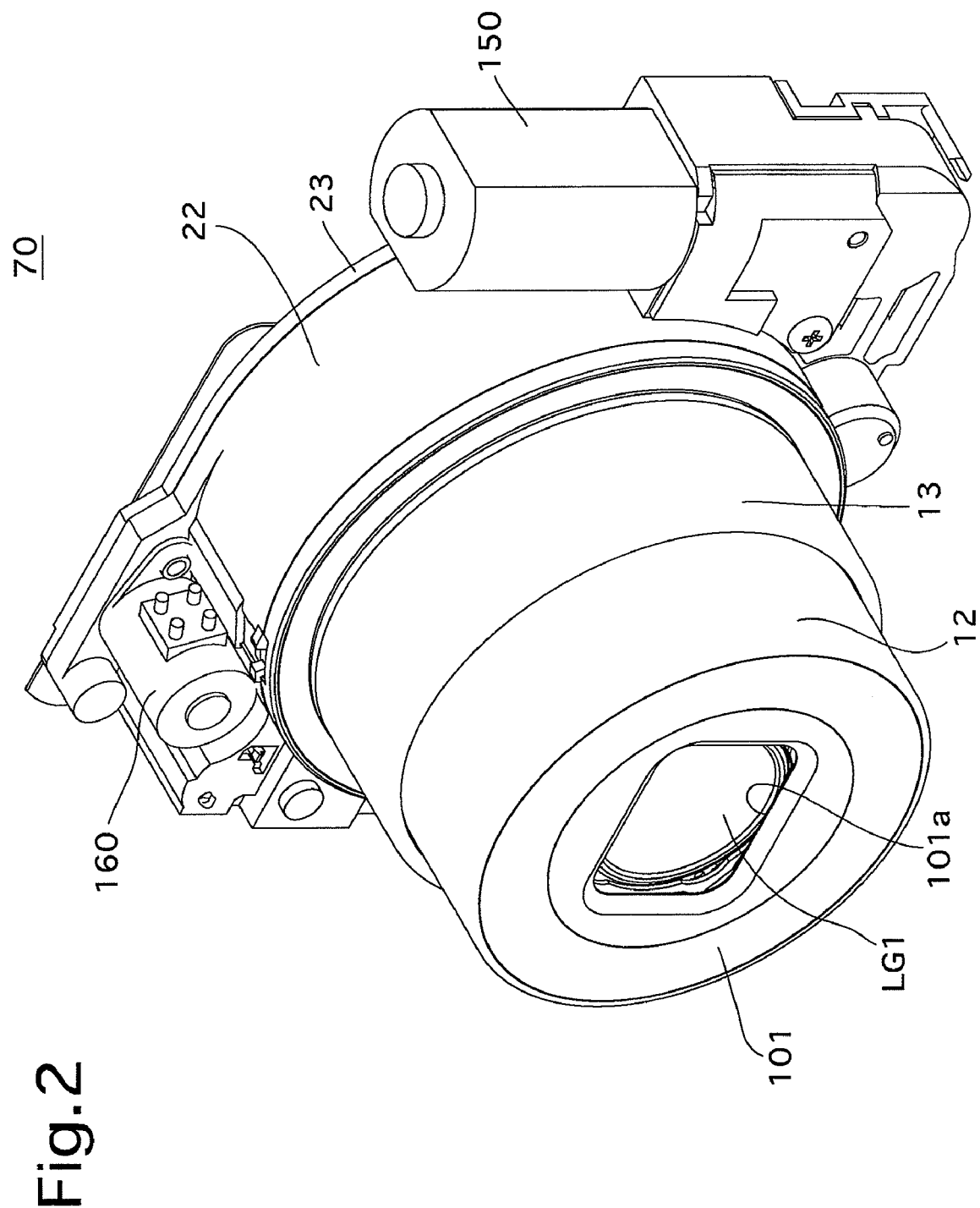
FIG. 2 is an external perspective view of the zoom lens barrel when the zoom lens barrel is in a ready-to-photograph state.
Figure 3:
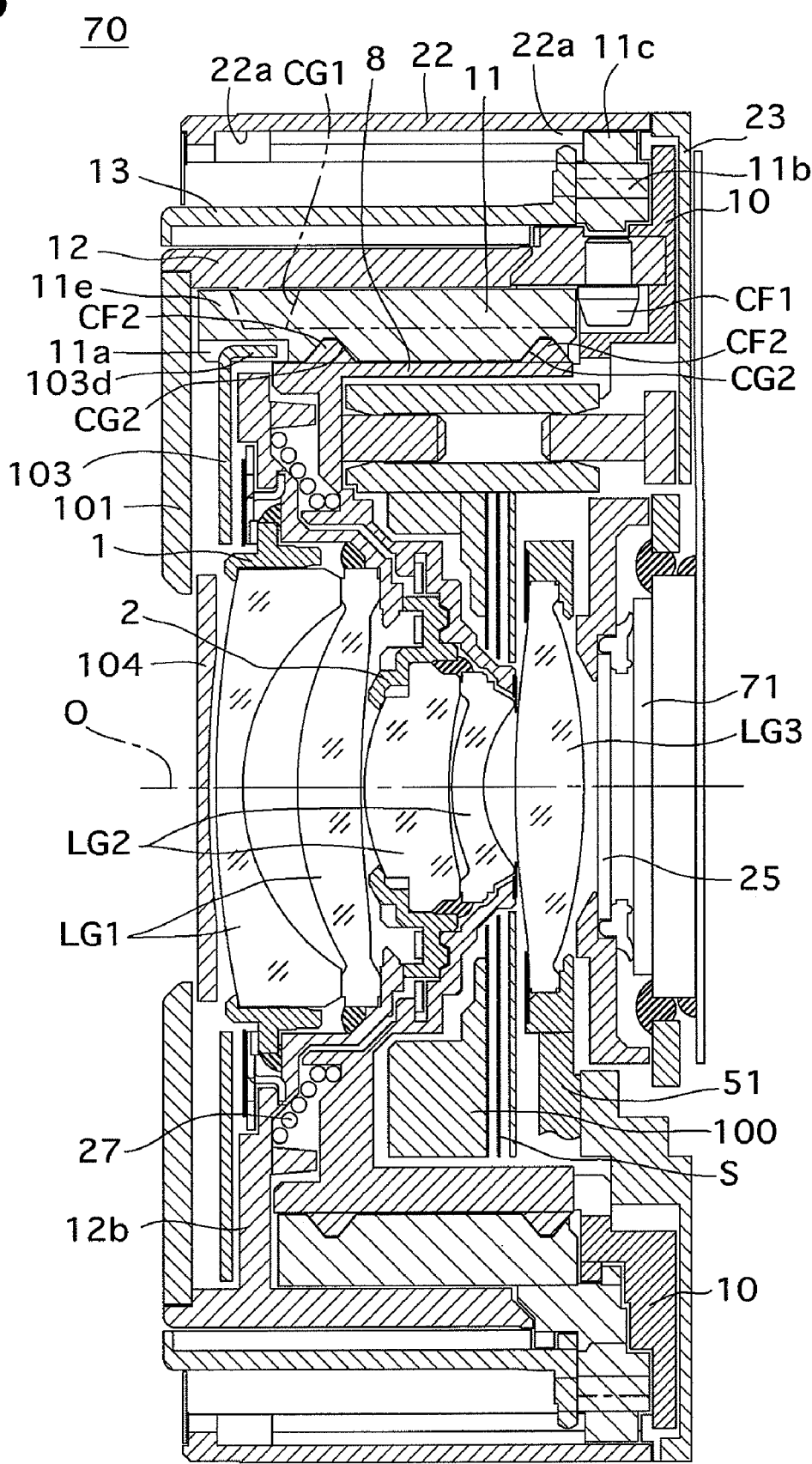
FIG. 3 is a cross sectional view of the zoom lens barrel when the zoom lens barrel is in the accommodated state.
Figure 4:
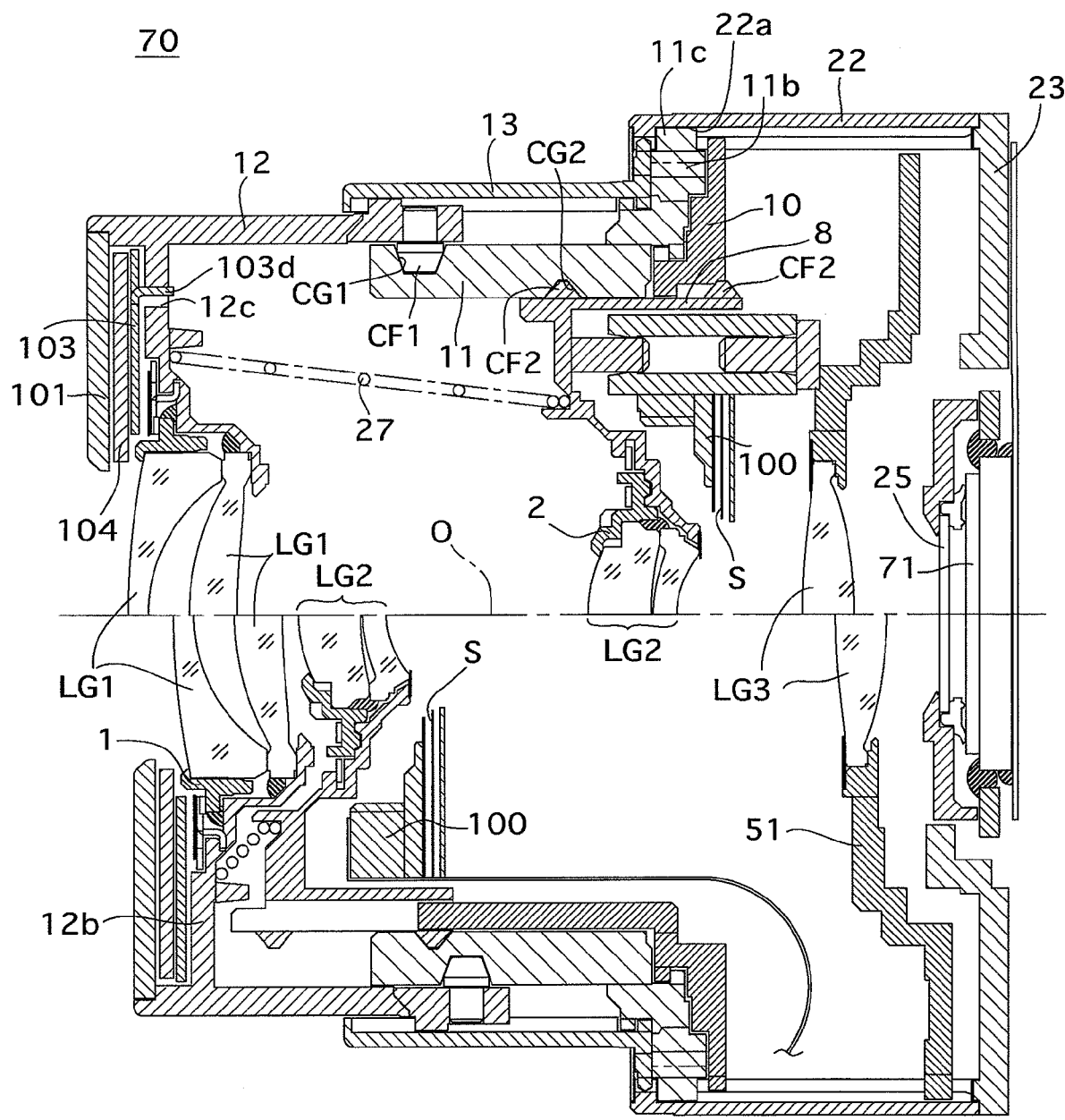
FIG. 4 is a cross sectional view of the zoom lens barrel when the zoom lens barrel is in a ready-to-photograph state, wherein the upper half and the lower half of the zoom lens barrel shown in FIG. 4 show the zoom lens barrel set at the wide-angle extremity and the telephoto extremity, respectively.

The brief description of the structure of a zoom lens barrel 70 including a lens barrier mechanism according to the present invention will be hereinafter discussed with reference to FIGS. 1 through 4. A photographing optical system of the zoom lens barrel 70 is provided with a first lens group LG1, a second lens group LG2, a set of shutter blades S that also serves as a set of diaphragm blades, a third lens group (AF lens group) LG3, a low-pass filter (optical filter) 25 and an image pickup device (image sensor) 71, in that order from the object side. In the following descriptions, the optical axis direction refers to a direction along or parallel to the photographing optical axis O of this photographing optical system.

The low-pass filter 25 and the image pickup device 71 are integrated as a single unit and this unit is fixed to an image pickup device holder 23, and the image pickup device holder 23 is fixed to the back of a housing 22 of the zoom lens barrel 70. A zoom motor 150 and an AF motor 160 are supported by the housing 22 on the outside thereof.

A third lens group frame 51 which supports the third lens group LG3 is supported by the housing 22 to be movable in the optical axis direction relative to the housing 22. The third lens group frame 51 is driven by the AF motor 160.

A cam ring 11 is supported in the housing 22 to be rotated by the driving force of the zoom motor 150. The cam ring 11 moves in the optical axis direction while rotating about the photographing optical axis O until reaching a ready-to-photograph state (the wide-angle extremity shown in the upper half of FIG. 4) from the lens barrel accommodated state (shown in FIG. 3), and the cam ring 11 rotates at a fixed position about the optical axis when the zoom lens barrel 70 is in the zooming range (between the wide-angle extremity shown in the upper half of FIG. 4 and the telephoto extremity shown in the lower half of FIG. 4) in a ready-to-photograph state.

The zoom lens barrel 70 is provided with a first advancing barrel 13 and a linear guide ring 10 which are supported by the housing 22 with the cam ring 11 being positioned between the first advancing barrel 13 and the linear guide ring 10. Each of the first advancing barrel 13 and the linear guide ring 10 is guided linearly in the optical axis direction relative to the housing 22. In addition, each of the first advancing barrel 13 and the linear guide ring 10 is coupled to the cam ring 11 to be rotatable relative to the cam ring 11 and to move with the cam ring 11 in the optical axis direction.

The linear guide ring 10 guides a second lens group moving frame 8 linearly in the optical axis direction so that the second lens group moving frame 8 can move linearly in the optical axis direction relative to the linear guide ring 10. The zoom lens barrel 70 is provided inside the second lens group moving frame 8 with a second lens group holding frame 2 and a shutter unit 100 which are supported by the second lens group moving frame 8. The second lens group holding frame 2 holds the second lens group LG2 and the shutter unit 100 supports the shutter blades S. In addition, the first advancing barrel 13, which is guided linearly in the optical axis direction relative to the housing 22, further guides a second advancing barrel (linearly movable barrel) 12 linearly in the optical axis direction so that the second advancing barrel 12 can move linearly in the optical axis direction relative to the first advancing barrel 13. The zoom lens barrel 70 is provided inside the second advancing barrel 12 with a first lens group holding frame 1 which holds the first lens group LG1.

The second advancing barrel 12 is provided with first cam followers CF1 for moving the first lens group LG1, each of which projects radially inwards. Each first cam follower CF1 slidably engages in an associated first-lens-group control cam groove CG1 formed on an outer peripheral surface of the cam ring 11. Since the second advancing barrel 12 is guided linearly in the optical axis direction via the first advancing barrel 13, a rotation of the cam ring 11 causes the second advancing barrel 12 (i.e., the first lens group LG1) to move in the optical axis direction in a predetermined moving manner in accordance with the contours of the first-lens-group control cam grooves CG1.

The second lens group moving frame 8 is provided on an outer peripheral surface thereof with second cam followers CF2, each of which projects radially outwards, for moving the second lens group LG2. Each second cam follower CF2 slidably engages in an associated second-lens-group control cam groove CG2 formed on an inner peripheral surface of the cam ring 11. Since the second lens group moving frame 8 is guided linearly in the optical axis direction via the linear guide ring 10, a rotation of the cam ring 11 causes the second lens group moving frame 8 (i.e., the second lens group LG2) to move in the optical axis direction in a predetermined moving manner in accordance with the contours of the second-lens-group control cam grooves CG2.

The zoom lens barrel 70 is provided between the second lens group moving frame 8 and the second advancing barrel 12 with an inter-lens-group biasing spring 27 in the form of a compression spring which biases the second lens group moving frame 8 and the second advancing barrel 12 in opposite directions away from each other.

Operations of the zoom lens barrel 70 that has the above described structure will be discussed hereinafter. In the lens barrel accommodated state shown in FIGS. 1 and 3, the length of the optical system in the optical axis direction (the distance from the front surface (object-side surface) of the first lens group LG1 to the imaging surface of the image pickup device 71) is shorter than that in a ready-to-photograph state shown in FIGS. 2 and 4. In the lens barrel accommodated state, immediately after a state transitional signal for transition from the lens barrel accommodated state to a ready-to-photograph state (e.g., turning ON a main switch of the camera to which the zoom lens barrel 70 is mounted) is input to the zoom lens barrel 70, the zoom motor 150 is driven in the lens barrel advancing direction, which causes the cam ring 11 to advance in the optical axis direction while rotating. The linear guide ring 10 and the first advancing barrel 13 linearly move with the cam ring 11. Upon the cam ring 11 being rotated, the second lens group moving frame 8, which is guided linearly in the optical axis direction via the linear guide ring 10, is moved in the optical axis direction in a predetermined moving manner inside the cam ring 11 due to the engagement of the second cam followers CF2 with the second-lens-group control cam grooves CG2. Additionally, upon the cam ring 11 being rotated, the second advancing barrel 12, which is guided linearly in the optical axis direction via the first advancing barrel 13, is moved in the optical axis direction in a predetermined moving manner due to the engagement of the first cam followers CF1 with the first-lens-group control cam grooves CG1.

Namely, the amount of advancement of the first lens group LG1 from the lens barrel accommodated state is determined by the sum of the amount of forward movement of the cam ring 11 relative to the housing 22 and the amount of advancement of the second advancing barrel 12 relative to the cam ring 11, and the amount of advancement of the second lens group LG2 from the lens barrel accommodated state is determined by the sum of the amount of forward movement of the cam ring 11 relative to the housing 22 and the amount of advancement of the second lens group moving frame 8 relative to the cam ring 11. A zooming operation is carried out by moving the first lens group LG1 and the second lens group LG2 in the optical axis direction while changing the air distance therebetween. Driving the zoom motor 150 in a barrel-advancing direction so as to advance the zoom lens barrel 70 from the lens barrel accommodated state firstly causes the zoom lens barrel 70 to move to the wide-angle extremity shown in the upper half of the cross sectional view in FIG. 4, and further driving the zoom motor 150 in the same direction causes the zoom lens barrel 70 to move to the telephoto extremity shown in the lower half of the cross sectional view in FIG. 4. In the zooming range between the telephoto-extremity and the wide-angle extremity, the cam ring 11 rotates at a fixed position as described above, thus not moving either forward or rearward in the optical axis direction. Immediately after a transition signal for transition from a ready-to-photograph state to the lens barrel accommodated state (e.g., for turning OFF the aforementioned main switch of the camera to which the zoom lens barrel 70 is mounted) is input to the zoom lens barrel 70, the zoom motor 150 is driven in the lens barrel retracting direction, which causes the zoom lens barrel 70 to perform a lens barrel retracting operation reverse to the above described lens barrel advancing operation.

The zoom lens barrel 70 is provided at the front end of the second advancing barrel 12 with a pair of barrier blades 104 which opens and shuts the front of the first lens group LG1. The pair of barrier blades 104 is closed in the lens barrel accommodated state, and opened in accordance with the lens barrel advancing operation.

The third lens group frame 51 that supports the third lens group LG3 can be moved forward and rearward in the optical axis direction by the AF motor 160 independently of the above described driving operations of the first lens group LG1 and the second lens group LG2 that are performed by the zoom motor 150. When the photographing optical system of the zoom lens barrel 70 is in the zooming range from the wide-angle extremity to the telephoto extremity, the third lens group LG3 is moved in the optical axis direction to perform a focusing operation by driving the AF motor 160 in accordance with object distance information obtained by a distance measuring device (not shown) provided, e.g., in the camera to which the zoom lens barrel 70 is mounted.

Figure 5:
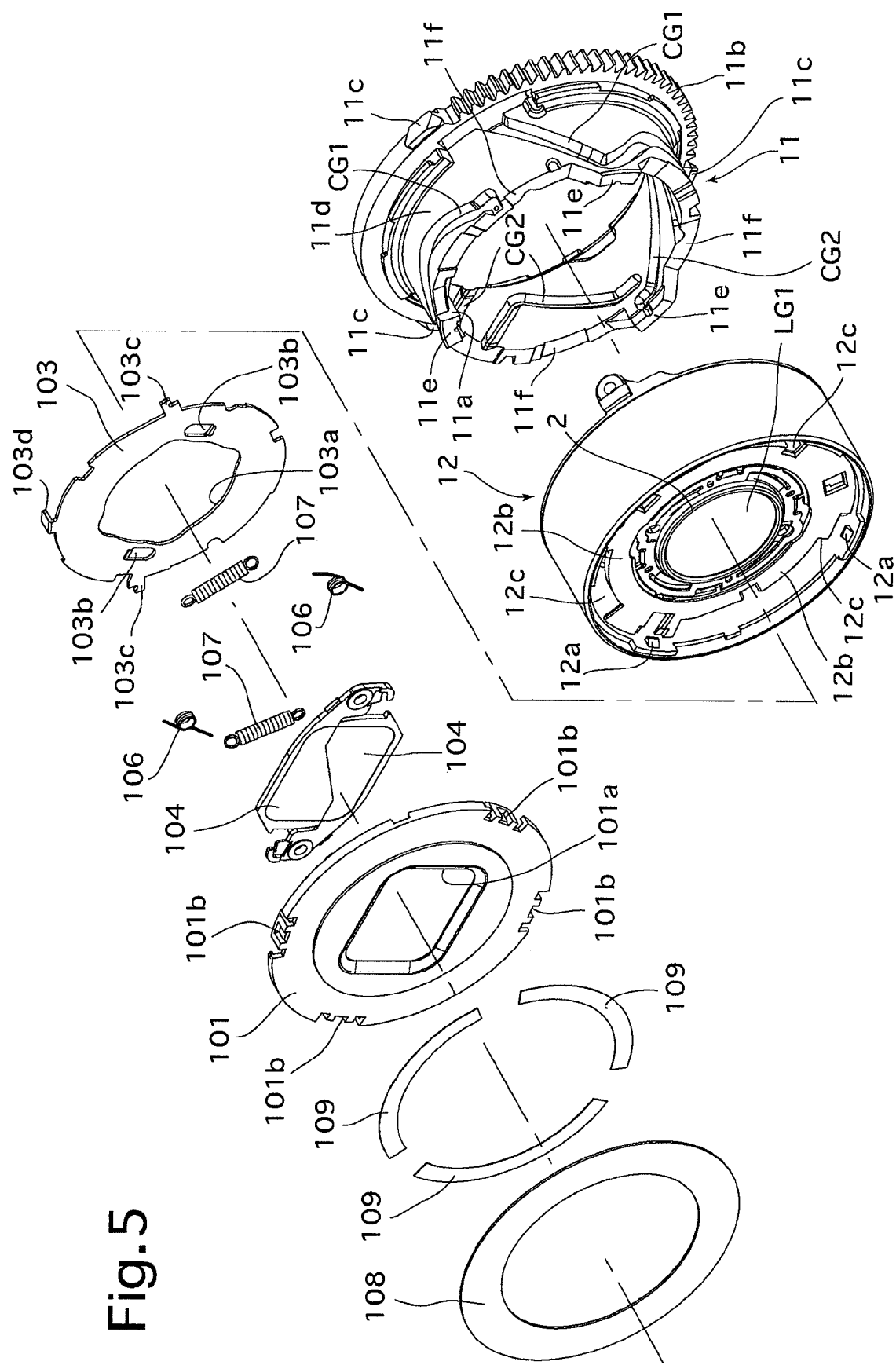
FIG. 5 is an exploded perspective view of a lens barrier mechanism fixed at the front end of the second advancing barrel and other associated elements of the zoom lens barrel.

FIG. 5 shows an exploded state of the lens barrier mechanism of the zoom lens barrel 70 that includes the pair of barrier blades 104. A barrier support member 101 having a laterally-elongated rectangular opening 101*a* is fixed to the front end of the second advancing barrel 12 with four engaging lugs 12*a* (only two of which appear in FIG. 5) which project radially inwards from the second advancing barrels 12 being engaged in four engaging holes 101*b*, respectively, that are formed on the outer edge of the barrier support member 101. A ring-shaped decorative plate 108 is fixed to the front of the barrier support member 101 by double-sided adhesive tapes 109 so that the engaged portions between the engaging lugs 12*a* and the engaging holes 101*b* are closed in a light-tight fashion.

The second advancing barrel 12 is provided with a barrier support flange (flange portion) 12*b* which lies in a plane substantially orthogonal to the photographing optical axis O in such a manner as to surround part of the first lens group LG1 in the vicinity of the front end thereof. The second advancing barrel 12 is provided between the barrier support flange 12*b* and the barrier support member 101 with the pair of barrier blades 104, a pair of torsion springs (constituting elements of a barrier drive mechanism/shutting-direction biasing springs) 106, a pair of extension springs (constituting elements of the barrier drive mechanism) 107, and a barrier drive ring (an element of the barrier drive mechanism) 103. The barrier support member 101 is provided, on the back thereof at positions substantially symmetrical with respect to the photographing optical axis O, with a pair of pivot shafts 101*c* (see FIGS. 7 and 8). The pair of barrier blades 104 can rotate about the pair of pivot shafts 101*c*, respectively, in an operating plane orthogonal to the photographing optical axis O between a closed position (shown by solid lines in FIG. 8), in which the opening 101a of the barrier support member 101 is closed by the pair of barrier blades 104, and an open position (shown in FIG. 7), in which the pair of barrier blades 104 are fully retracted radially outwards so that the opening 110a of the barrier support member 101 is fully open. The pair of barrier blades 104 are continuously biased to rotate in directions to close the opening 101a by the pair of torsion springs 106, respectively.

Figure 7:
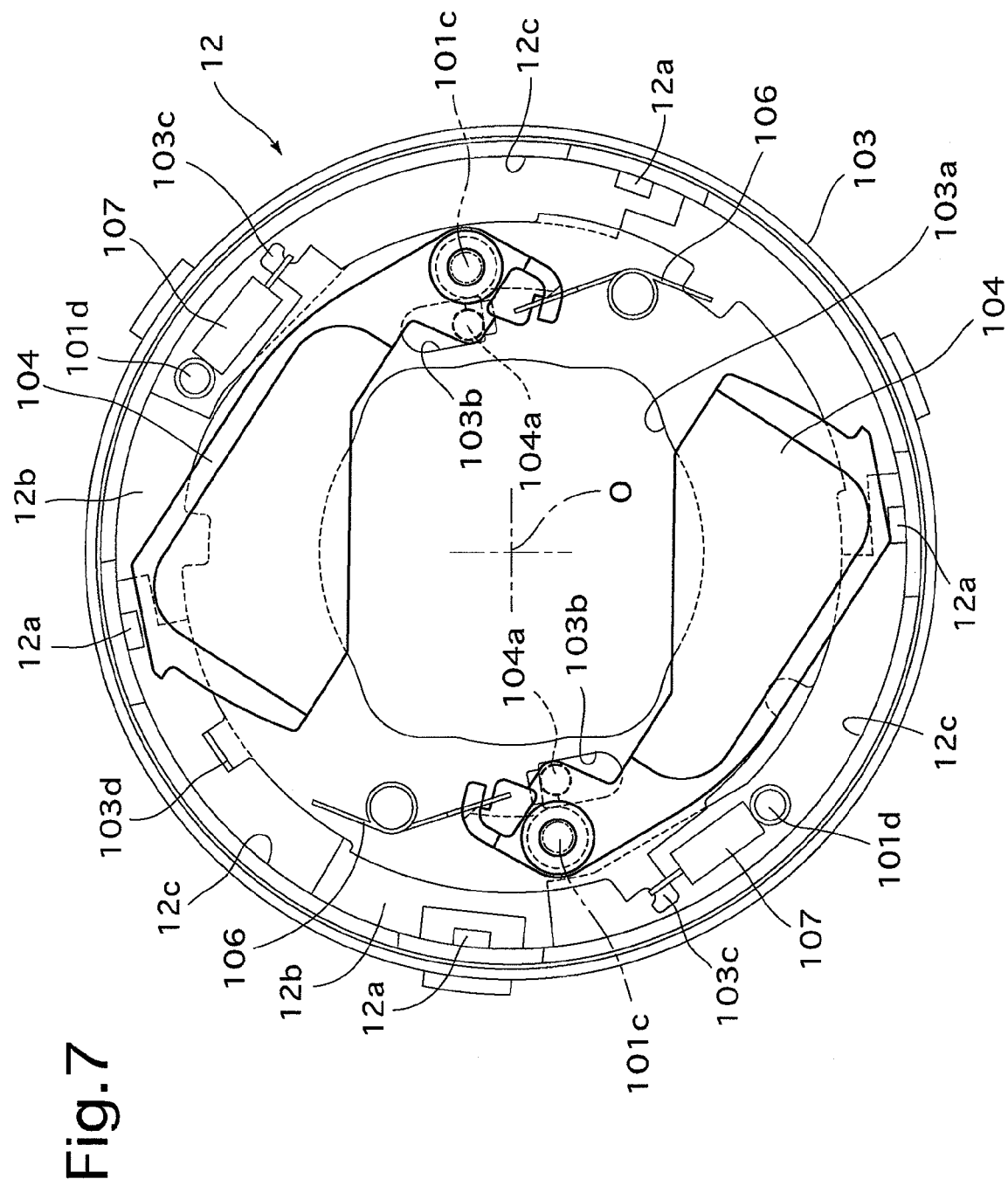
FIG. 7 is a front elevational view of the lens barrier mechanism with a barrier support member that is fixed at the front of the lens barrier mechanism removed in a ready-to-photograph state of the zoom lens barrel.

The barrier drive ring 103 is supported by the second advancing barrel 12 to be rotatable relative to the second advancing barrel 12 about the photographing optical axis O by a predetermined angle. The barrier drive ring 103 is provided, at a center thereof through which the photographing optical system O passes, with a central opening 103a which corresponds to the rectangular opening 101a, and is further provided on opposite sides of the central opening 103a with a pair of barrier drive holes 103b. An opening/closing control boss 104a projects from each barrier blade 104 to be engaged in the associated barrier drive hole 103b (see FIGS. 7 and 8). As shown by solid lines in FIG. 8, if the barrier drive ring 103 is made to rotate in the counterclockwise direction with respect to FIG. 8 in which the pair of barrier blades 104 are shut, an edge of each barrier drive hole 103b comes into contact with, and thereafter presses, the associated opening/closing control boss 104a, so that it is possible to open the pair of barrier blades 104 as shown in FIG. 7 against the biasing force of the pair of torsion springs 106 in directions to open the opening 101a. The pair of extension springs 107 have a greater biasing force than the pair of torsion springs 106, and the pair of extension springs 107 are stretched and installed between a pair of spring hooks 103c of the barrier drive ring 103 and a pair of spring hooks 101d of the barrier support member 101, respectively. The barrier drive ring 103 is biased to rotate in a direction to open the pair of barrier blades 104 (the counterclockwise direction with respect to FIGS. 7 and 8) by the pair of extension springs 107. Accordingly, when the barrier drive ring 103 is positioned at the limit of rotation thereof (the position shown in FIG. 7) in the direction to open the pair of barrier blades 104 by the pair of extension springs 107, the aforementioned edge of each barrier drive hole 103b continuously presses the associated opening/closing control boss 104a so that the pair of barrier blades 104 remain open against the biasing force of the pair of torsion springs 106.

The barrier support flange 12b of the second advancing barrel 12 is provided, on different radially outer portions thereof in the vicinity of the inner peripheral surface of the second advancing barrel 12, with three through-holes 12c which are formed through the barrier support flange 12b in the optical axis direction. The barrier drive ring 103 is provided with a rotational transfer projection 103d which projects rearward through one of the plurality of through-holes 12c, and the position of the barrier drive ring 103 is controlled by engagement/disengagement of the rotational transfer projection 103d with/from one of three rotation imparting stepped portions 11a formed at a front end of the cam ring 11. The relationship between the barrier drive ring 103 and the cam ring 11 will be discussed in detail hereinafter.

Figure 6:
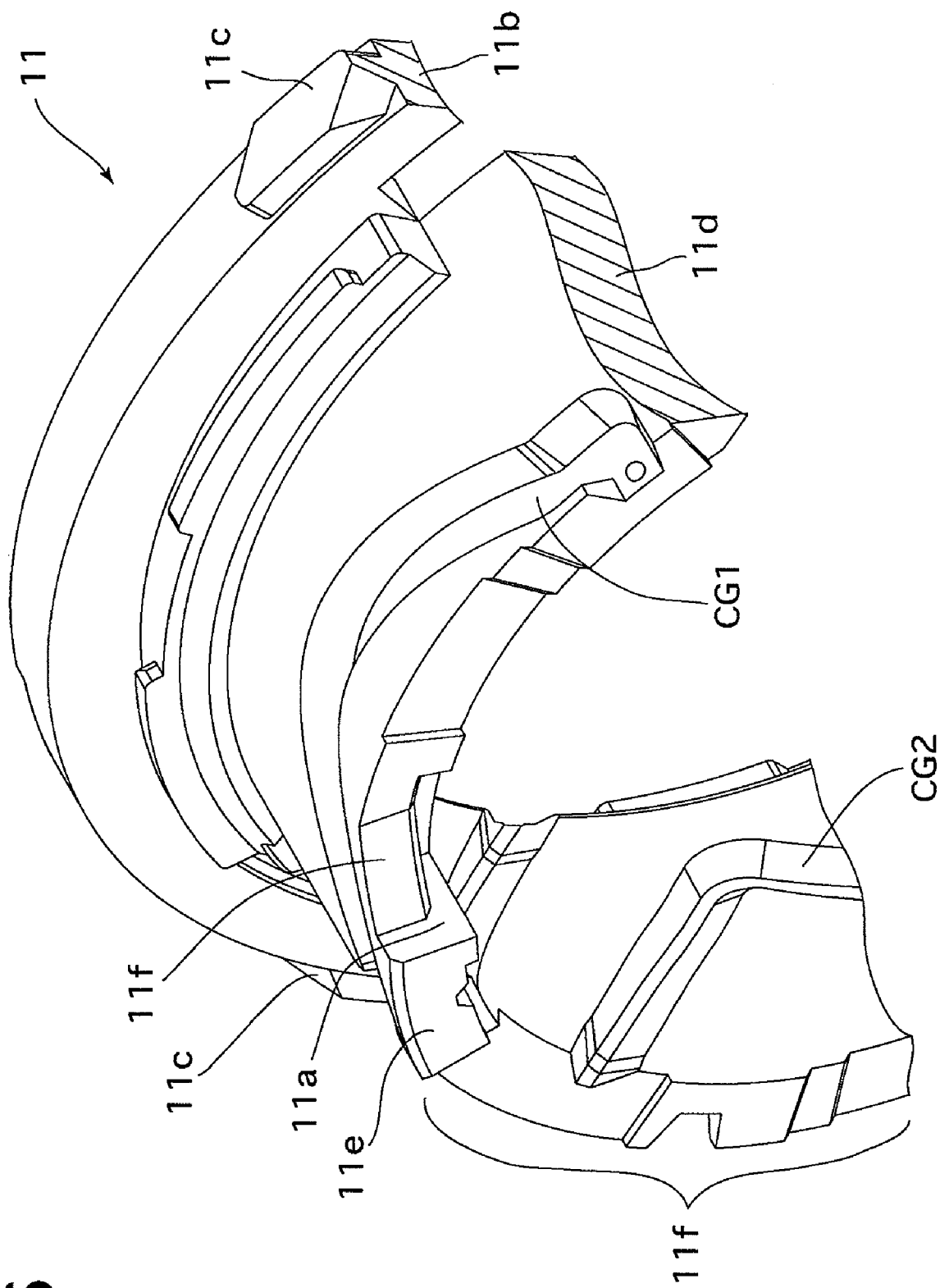
FIG. 6 is a perspective view of a portion of a cam ring shown in FIGS. 3 through 5.

The cam ring 11 is provided, at the rear end thereof in the optical axis direction, with a gear ring portion 11b, and a set of three guide projections 11c that project radially outwards from the gear ring portion 11b (see FIGS. 5 and 6). The gear ring portion 11b is engaged with a zoom gear (not shown) rotated by the zoom motor 150, and the guide projections 11c are slidably engaged in cam ring guide grooves 22a (see FIGS. 3 and 4) formed on an inner peripheral surface of the housing 22. Each cam ring guide groove 22a is provided, in the back and the front thereof in the optical axis direction, with a helical groove portion and a ring-shaped (circumferential) groove portion having the center thereof on the photographing optical axis O, respectively. When the zoom lens barrel 70 is in between the accommodated state and a ready-to-photograph state (at the wide-angle extremity), the cam ring 11 moves in the optical axis direction while rotating with the guide projections 11c being guided by the helical groove portions of the cam ring guide grooves 22a. Specifically, when the zoom lens barrel 70 moves from the accommodated state to a ready-to-photograph state, the cam ring 11 moves forward (toward the object side) in the optical axis direction while rotating. Conversely, when the zoom lens barrel 70 moves from a ready-to-photograph state to the accommodated state, the cam ring moves rearward in the optical axis direction while rotating. When the zoom lens barrel 70 is in the zooming range from the wide-angle extremity to the telephoto extremity, the cam ring 11 is rotated at a fixed position in the optical axis direction (i.e., without changing the position thereof in the optical axis direction) while the guide projections 11c are guided by the ring-shaped groove portion of the cam ring guide grooves 22a.

Figure 11:
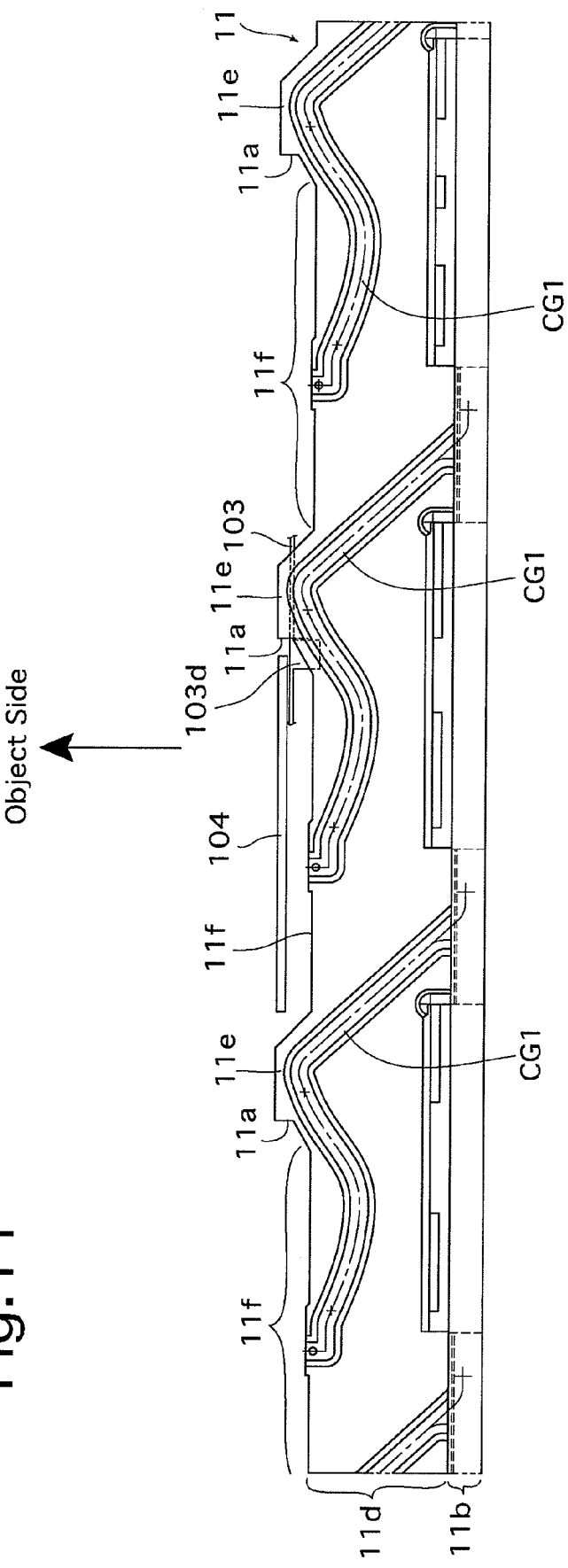
FIG. 11 is a developed plan view of the cam ring and barrier blades of the lens barrier mechanism in the accommodated state of the zoom lens barrel, showing the relative position between the cam ring and the barrier blades.

The cam ring 11 is provided in front of the gear ring portion 11b with a cylindrical portion 11d. A set of three first-lens-group control cam grooves CG1 and a set of three second-lens-group control cam grooves CG2 are formed on an outer peripheral surface and an inner peripheral surface of the cylindrical portion 11d, respectively. The cylindrical portion 11d is provided at the front end thereof with three forward-projecting portions 11e and three front end faces 11f which are alternately arranged in the circumferential direction of the cylindrical portion 11d. The three front end faces 11f are positioned rearwardly from the three forward-projecting portions 11e in the optical axis direction. As shown in FIGS. 6 and 11, the three forward-projecting portions 11e are each provided with a side surface which lies in a plane substantially parallel to the photographing optical axis O, and these side surfaces constitute the aforementioned three rotation imparting stepped portions 11a, respectively, one of which (previously selected) is engaged with and disengaged from the rotational transfer projection 103d. The formation positions of the three first-lens-group control cam grooves CG1 and the three second-lens-group control cam grooves CG2 are determined so that frontmost portions of the three first-lens-group control cam grooves CG1 in the optical axis direction are formed on radially outer sides of the three forward-projecting portions 11e, respectively (see FIG. 11), and so that frontmost portions of the three second-lens-group control cam grooves CG2 in the optical axis direction are formed on radially inner sides of the three forward-projecting portions 11e, respectively (see FIG. 5). In other words, in the cam ring 11, the three front end faces 11f are formed in such a manner as to partly cut out the front end of the cylindrical portion 11d within a range so as not to interfere with the contours of either the three first-lens-group control cam grooves CG1 or the three second-lens-group control cam grooves CG2, and the three forward-projecting portions 11e are preserved only on indispensable portions of the front end of the cylindrical portion 11d that cannot be cut out because of the existence of the three first-lens-group control cam grooves CG1 and the three second-lens-group control cam grooves CG2. Due to this structure, the cam ring 11 has been made compact in size. The three forward-projecting portions 11e are arranged at substantially equi-angular intervals about the photographing optical axis O (intervals of 120 degrees) and are mutually identical in shape and size.

As described above, the second advancing barrel 12 moves linearly in the optical axis direction while being guided by the three first-lens-group control cam grooves CG1 in accordance with rotation of the cam ring 11, and the second advancing barrel 12 moves rearward in the optical axis direction when the zoom lens barrel 70 moves from a ready-to-photograph state (at the wide-angle extremity) to the accommodated state. In this retracting operation of the zoom lens barrel 70 to the accommodated state, the amount of this rearward movement of the second advancing barrel 12 relative to the cam ring 11 is greater than the amount of rearward movement of the cam ring 11 relative to the housing 22. Therefore, none of the three forward-projecting portions 11e is engaged with the rotational transfer projection 103d in a ready-to-photograph state as shown in FIGS. 7 and 9; however, when the zoom lens barrel 70 is fully retracted, the rotational transfer projection 103d and one of the three forward-projecting portions 11e approach each other in the optical axis direction and also approach each other in a circumferential direction about the photographing optical axis O, and one of the three rotation imparting stepped portions 11a comes into contact with the rotational transfer projection 103d at some point in the lens barrel retracting operation. Thereupon, a turning force in a direction opposite to the biasing force of the pair of extension springs 107 is applied to the rotational transfer projection 103d by the rotating cam ring 11 via the currently-engaged rotation imparting stepped portion 11a. When the barrier drive ring 103 is rotated to the limit of rotation thereof as shown in FIG. 8 against the biasing force of the pair of extension springs 107, the pressing contact of the edges of the two barrier drive holes 103b against the two opening/closing control bosses 104a are released, so that the pair of barrier blades 104 are shut by the biasing force of the pair of torsion springs 106.

Conversely, when the zoom lens barrel 70 moves from the accommodated state to a ready-to-photograph state (in the zooming range), the rotational transfer projection 103d is disengaged from one of the three rotation imparting stepped portions 11a (one of the three forward-projecting portions 11e) due to the relative movement in the optical axis direction between the cam ring 11 and the second advancing barrel 12 and the relative rotation therebetween. This causes the barrier drive ring 103 to rotate in the direction to open the pair of barrier blades 104 via the pair of extension springs 107, thus causing an edge of each barrier drive hole 103b to press the associated opening/closing control boss 104a to thereby open the pair of barrier blades 104.

Accordingly, the opening and shutting operations of the pair of barrier blades 104 are controlled by rotation of the barrier drive ring 103, and the barrier drive ring 103 is made to rotate in the direction to shut the pair of barrier blades 104 by the cam ring 11. The three forward-projecting portions 11e are formed on the cam ring 11 at substantially equi-angular intervals in a rotation direction of the cam ring 11, and the forward-projecting portion 11e (rotation imparting stepped portion 11a) which comes in contact with the rotational transfer projection 103d to be used for rotation control of the barrier drive ring 103 can be freely selected from among the three forward-projecting portions 11e during assembly.

Figure 8:
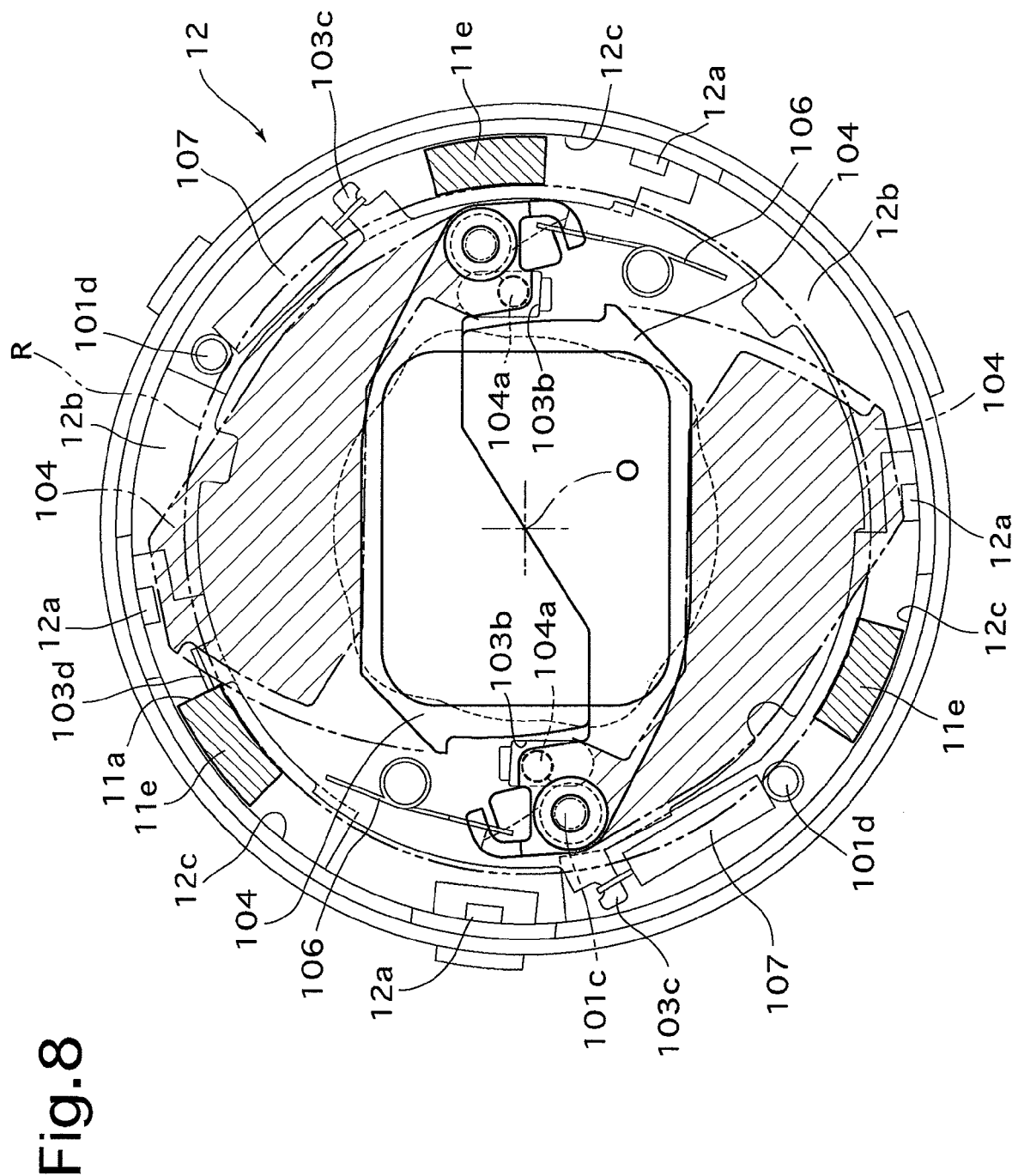
FIG. 8 is a front elevational view of the lens barrier mechanism with the barrier support member being removed in the accommodated state of the zoom lens barrel.
Figure 9:
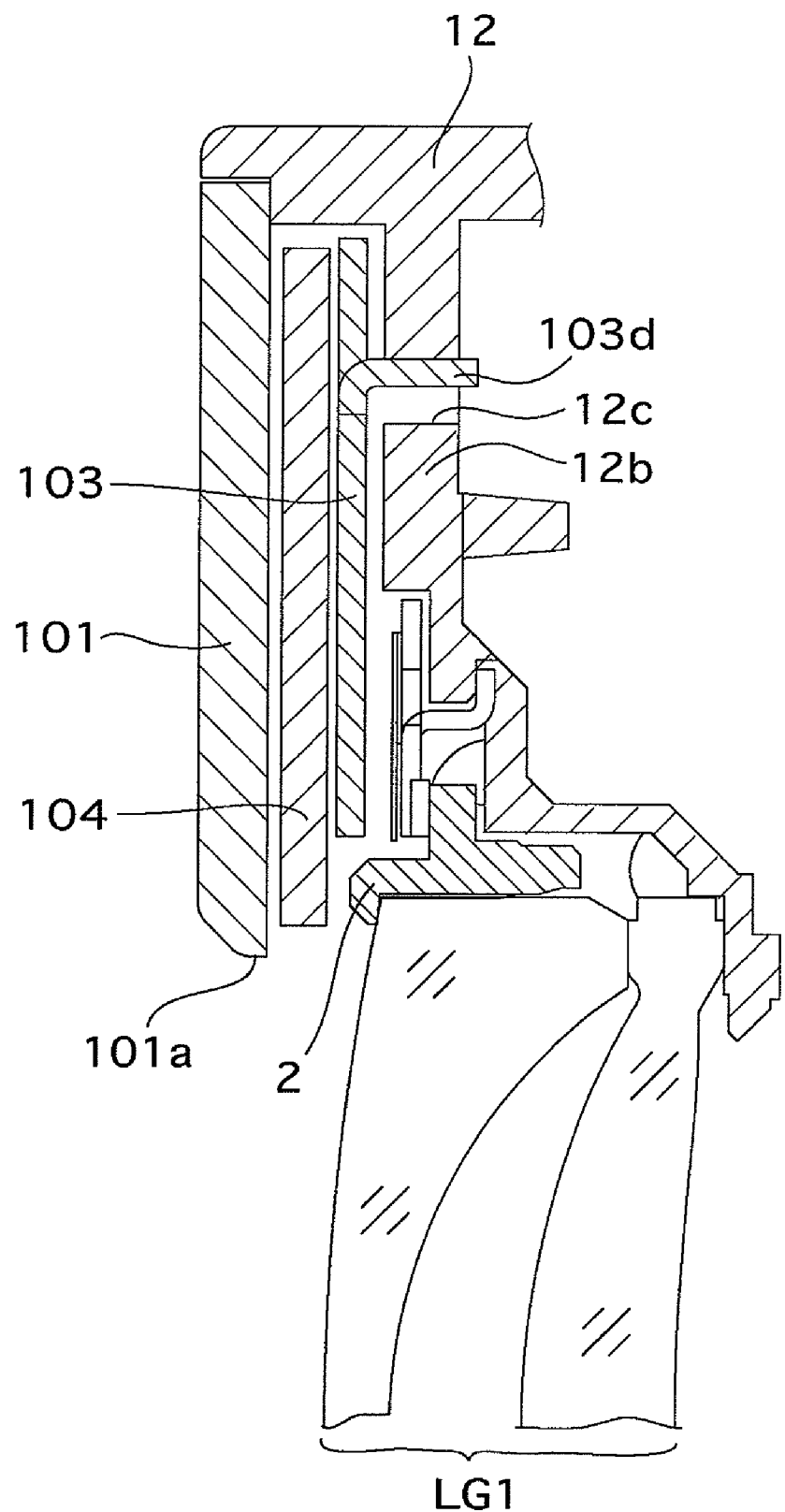
FIG. 9 is a cross sectional view of a portion of the zoom lens barrel in the vicinity of the lens barrier mechanism in a ready-to-photograph state of the zoom lens barrel.
Figure 10:
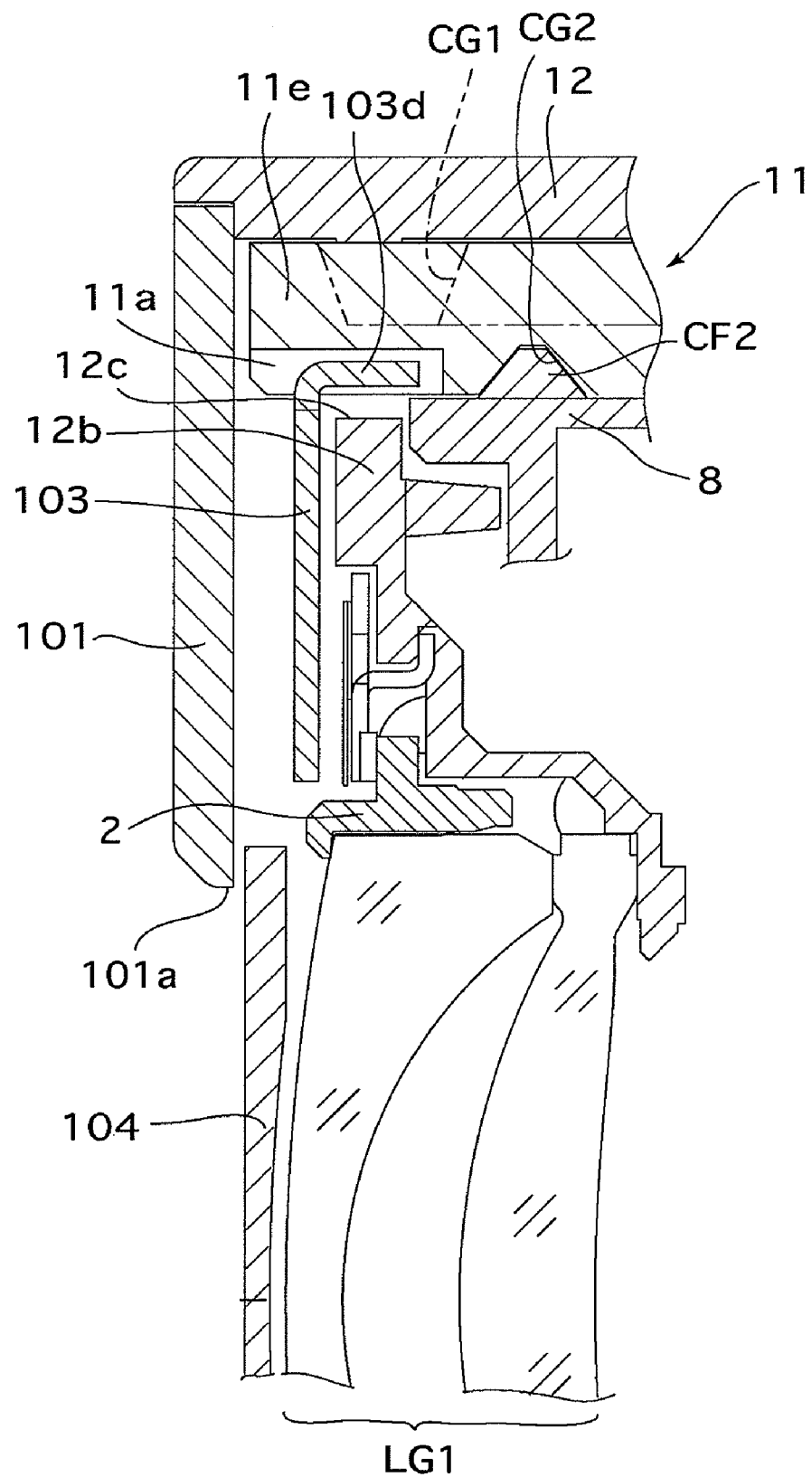
FIG. 10 is a cross sectional view of a portion of the zoom lens barrel in the vicinity of the lens barrier mechanism in the accommodated state of the zoom lens barrel.

As shown in FIG. 8, when the pair of barrier blades 104 are fully opened (as shown by two-dot chain lines in FIG. 8), the radially outermost part of each barrier blade 104 is positioned outside an inner circle R (shown by a two-dot chain line in FIG. 8) defined by the inner periphery of the three forward-projecting portions 11e about the photographing optical axis O as viewed along the photographing optical axis O. In other words, the range of opening/shutting operation of the pair of barrier blades 104 extends radially outwards beyond the position of the inner circle R of the three forward-projecting portions 11e in radial directions with respect to the photographing optical axis O. In addition, as shown in FIGS. 10 and 11, when the zoom lens barrel 70 is in the accommodated state, not only do the forward-projecting portions 11e (the three rotation imparting stepped portions 11a) of the cam ring 11 coincide with the rotational transfer projection 103d but also the forward-projecting portions 11e have been relatively moved into an internal space of the zoom lens barrel 70 in front of the barrier support flange 12b (between the barrier support member 101 and the barrier support flange 12b) through the three through-holes 12c of the second advancing barrel 12, and the three forward-projecting portions 11e in the vicinity of the front ends thereof intersect (coincide with) the aforementioned operating plane in which the pair of barrier blades 104 move. Although the pair of barrier blades 104 are shut by the biasing force of the pair of torsion springs 106 when the zoom lens barrel 70 is in the accommodated state as described above, the pair of barrier blades 104 can be opened as shown by two-dot chain lines in FIG. 8 by manually exerting a force directly to the pair of barrier blades 104 by a finger, or the like. However, all the three forward-projecting portions 11e are at positions that do not interfere with either of the pair of barrier blades 104 in the operating plane thereof even if the pair of barrier blades 104 are fully opened, i.e., at positions outside the range of opening/shutting operation (the opening/shutting moving path) of the pair of barrier blades 104. Therefore, when each barrier blade 104 is fully opened in the lens barrel accommodated state, the outer edge of each barrier blade 104 advances to a position in front of the three front end faces 11f in the optical axis direction with no interference with the three forward-projecting portions 11e, so that the opening/shutting operation of each barrier blade 104 is not disturbed thereby. This structure makes it possible to prevent the lens barrier mechanism from malfunctioning and being damaged.

As described above, the amount of rearward movement of the second advancing barrel 12 relative to the cam ring 11 when the zoom lens barrel 70 is fully retracted can be increased by the above described structure which prevents the three forward-projecting portions 11e and the pair of barrier blades 104 from interfering with one another even if the three forward-projecting portions 11e that operate the barrier drive ring 103 are advanced (relatively moved) to the position of the aforementioned operating plane in which the pair of barrier blades 104 move. This improves the efficiency of space utilization, thus making it possible to achieve a further reduction in length of the zoom lens barrel 70 in the accommodated state thereof.

Figure 12:
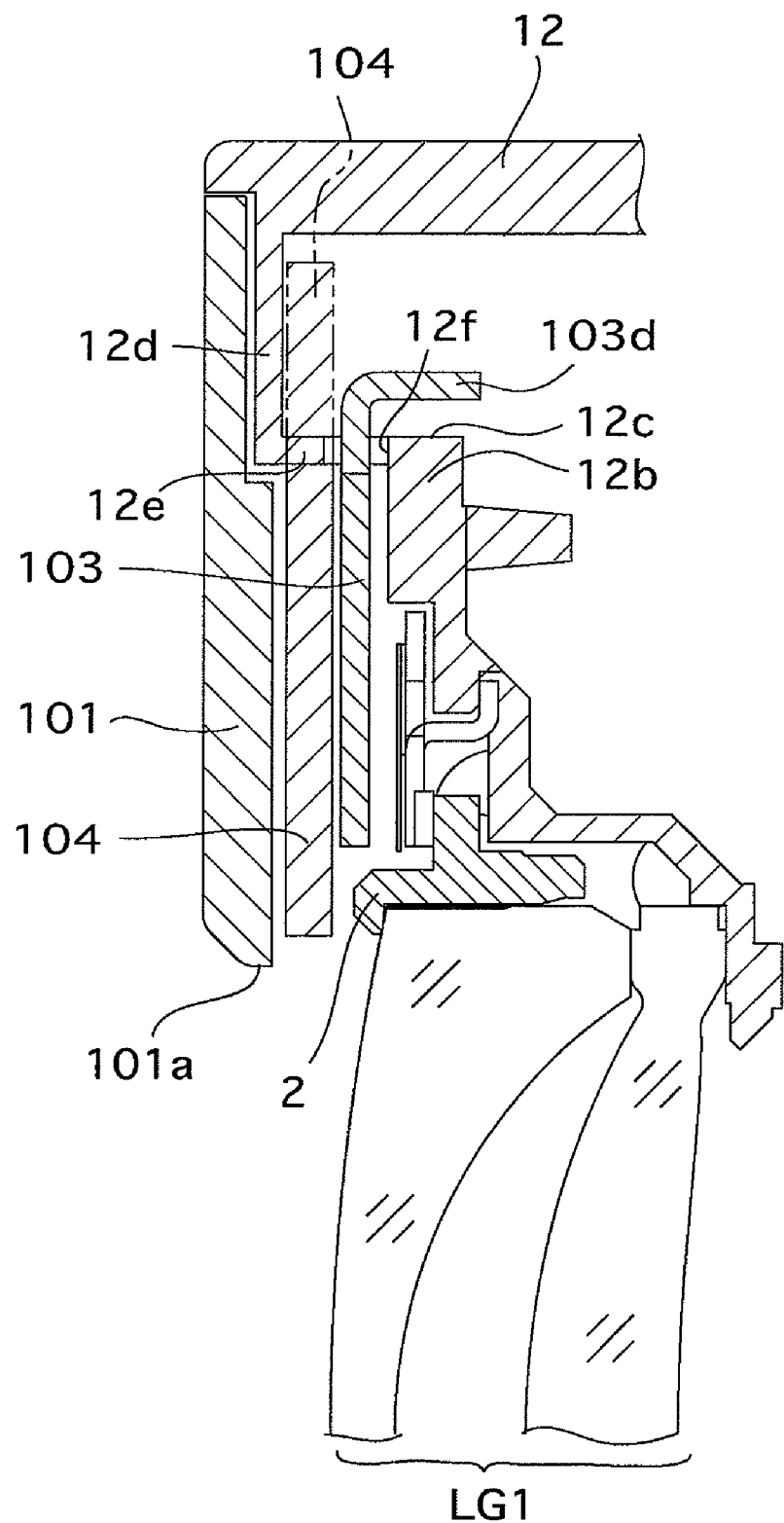
FIG. 12 is a view similar to that of FIG. 9, showing a second embodiment of the lens barrier mechanism in a ready-to-photograph state of the zoom lens barrel.
Figure 13:
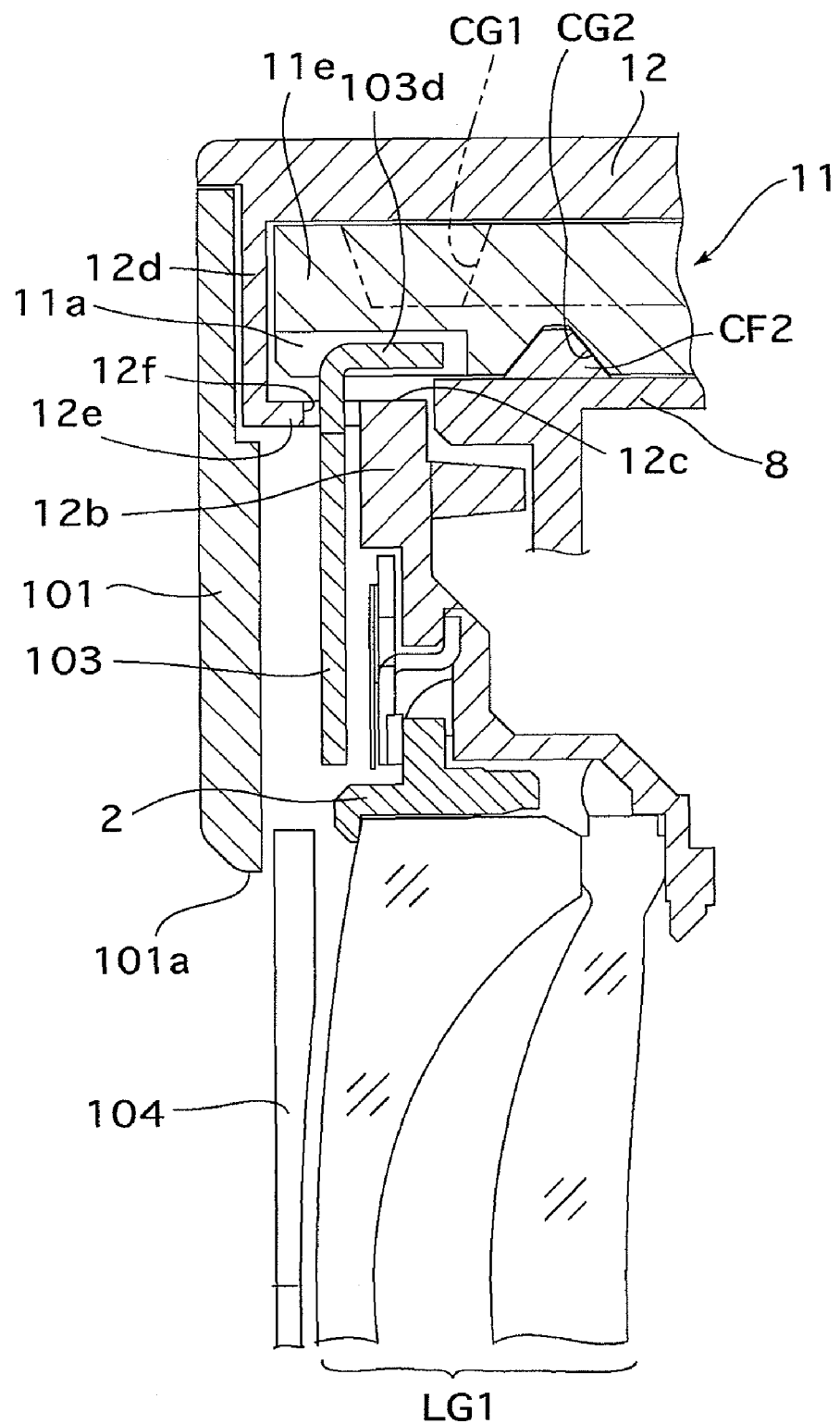
FIG. 13 is a view similar to that of FIG. 10, showing the second embodiment of the lens barrier mechanism in the accommodated state of the zoom lens barrel.

FIGS. 12 and 13 show another embodiment (second embodiment) of the lens barrier mechanism. In this embodiment, the second advancing barrel 12 is provided in front of the barrier support flange 12b thereof with three front wall portions 12d so as to be positioned in front of the pair of barrier blades 104 in the optical axis direction. The three front wall portions 12d are formed at different circumferential positions so as to cover the front of each three forward-projecting portions 11e, respectively, (i.e., at positions where the three front wall portions 12d do not overlap the range of opening/shutting operation of the pair of barrier blades 104 as viewed along the photographing optical axis O) when the zoom lens barrel 70 is fully retracted. The second advancing barrel 12 is provided between the three front wall portions 12d and the barrier support flange 12b with three bridge portions 12e which are formed at positions outside the range of opening/shutting operation of the pair of barrier blades 104, and the three front wall portions 12*d* and the barrier support flange 12*b* are connected to each other by the three bridge portions 12*e*, respectively. The rotational transfer projection 103*d* of the barrier drive ring 103 is inserted into an internal space of the second advancing barrel 12 behind the three front wall portions 12*d* through a radial through hole 12*f* formed through one of the bridge portions 12*e*.

When the zoom lens barrel 70 is in a ready-to-photograph state, the outer edge of each barrier blade 104 having been rotated to the fully-opened position thereof is positioned behind the three front wall portions 12*d* as shown by two-dot chain lines in FIG. 12. When the zoom lens barrel 70 is in the accommodated state, the three forward-projecting portions 11*e* of the cam ring 11 are positioned immediately behind and adjacent to the three front wall portions 12*d* beyond the barrier support flange 12*b* and through the three through-holes 12*c*, and the three forward-projecting portions 11*e* at the front ends thereof intersect the operating plane of the pair of barrier blades 104. In this state, the three bridge portions 12*e* of the second advancing barrel 12 and the three forward-projecting portions 11*e* of the cam ring 11 are positioned so as not to overlap the range of opening/shutting operation of the pair of barrier blades 104, so that each barrier blade 104 does not interfere with any of the three bridge portions 12*e* or any of the three forward-projecting portions 11*e* even if opened.

In the embodiment shown in FIGS. 12 and 13, the front wall portions 12*d* respectively cover the three through-holes 12*c* that are formed through the barrier support flange 12*b*, and accordingly, light-shielding performance (capability of preventing harmful light from entering) and resistance to dust at the lens barrier mechanism can be enhanced.

Although the present invention has been described with reference to the foregoing particular embodiments, the present invention is not limited solely to these particular embodiments. For instance, although the barrier drive ring 103 is rotated by being pressed by the three forward-projecting portions 11*e* (the three rotation imparting stepped portions 11*a*) of the cam ring 11, the barrier drive mechanism of the lens barrier mechanism according to the present invention is not limited solely to such a barrier drive mechanism using a drive ring such as the barrier drive ring 103. The present invention can be applied to a different type of lens barrier mechanism which uses rotation of a cam ring as a force at least for controlling the opening/shutting operation of the barrier blades. In addition, in the type of lens barrier mechanism using a barrier drive ring, the barrier drive ring can be positioned in front of the barrier blades, unlike the barrier drive ring 103 used in each of the above described embodiments. Additionally, the detailed structures of the lens barrier mechanism such as the number of barrier blades, the number of springs for biasing the barrier blades and the configuration of the barrier blades are not limited to those in the above described embodiments of the lens barrier mechanisms.

Additionally, although the cam ring 11 rotates while moving forward and rearward in the optical axis direction between a ready-to-photograph state and the accommodated state in each of the above described embodiments of the lens barrier mechanisms, the cam ring of the lens barrier mechanism according to the present invention can be of a type which rotates without moving in the optical axis direction between a ready-to-photograph state and the accommodated state.

In each of the above described first and second embodiments, the cam ring 11 is provided thereon with the set of three first-lens-group control cam grooves CG1 and the set of three second-lens-group control cam grooves CG2, and the frontmost portions of the three first-lens-group control cam grooves CG1 and the frontmost portions of the three second-lens-group control cam grooves CG2 in the optical axis direction are formed on the three forward-projecting portions 11*e*. According to this configuration, the cylindrical portion 11*d* of the cam ring 11 other than the three forward-projecting portions 11*e* can be shaped into a cylinder of a short length in the optical axis direction which includes the three front end faces 11*f* at the front end of this short cylinder, so that miniaturization of the cam ring 11 is achieved without impairment of cam tracks essential on optical design. However, if the cam grooves of the cam ring 11 can be shaped so as not to be formed across the three forward-projecting portions 11*e*, the number of the forward-projecting portions 11*e* can be determined regardless of the number of the cam grooves of the cam ring 11, and accordingly, for instance, it is possible for a single forward-projecting portion 11*e* (single rotation imparting stepped portion 11*a*) to be formed on the cam ring 11 to correspond to the single rotational transfer projection 103*d* of the barrier drive ring 103. Alternatively, it is possible for at least two rotational transfer projections 103*d* and the corresponding number of forward-projecting portions 11*e* (the corresponding number of rotation imparting stepped portions 11*a*) to be formed on the barrier drive ring 103 and the cam ring 11, respectively. Either case is possible so long as the forward-projecting portion or portions 11*e* of the cam ring 11 are advanced (relatively moved) into the aforementioned operating plane (in which the pair of barrier blades 104 move) and positioned outside the range of opening/shutting operation of the pair of barrier blades 104 in the operating plane.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A lens barrier mechanism of a lens barrel movable between a ready-to-photograph state and an accommodated state in which no pictures can be taken, said lens barrier mechanism comprising:

a cam ring which rotates when said lens barrel moves between said ready-to-photograph state and said accommodated state, wherein said cam ring includes a cylindrical portion on which at least one cam groove is formed, and at least one forward-projecting portion which projects forward in an optical axis direction from said cylindrical portion;

a linearly movable barrel provided outside said cam ring, said linearly movable barrel being moved linearly in said optical axis direction by rotation of said cam ring while being guided by said cam groove;

at least one barrier blade supported by said linearly movable barrel to be movable in an operating plane orthogonal to said optical axis so as to open and close an opening formed at the front of said linearly movable barrel; and a barrier drive mechanism which opens said barrier blade when said lens barrel moves from said accommodated state to said ready-to-photograph state and shuts said barrier blade when said lens barrel moves from said ready-to-photograph state to said accommodated state, wherein a range of opening/shutting operation of said barrier blade extends radially outside a position of an inner periphery of said forward-projecting portion in a radial direction of said lens barrel with respect to said optical axis, and wherein, when said lens barrel is in said accommodated state, said forward-projecting portion intersects said operating plane of said barrier blade, and said forward-projecting portion is positioned outside said range of opening/shutting operation of said barrier blade in said operating plane.

2. The lens barrier mechanism according to claim 1, wherein said linearly movable barrel comprises a flange portion provided rearward from said barrier blade in said optical axis direction,
   wherein, when said lens barrel is in said ready-to-photograph state, said forward-projecting portion of said cam ring is positioned behind said flange portion in said optical axis direction, and
   wherein, when said lens barrel moves from said ready-to-photograph state to said accommodated state, said forward-projecting portion of said cam ring relatively moves through a through-hole, which is formed through said flange portion, so that said forward-projecting portion intersects said operating plane.

3. The lens barrier mechanism according to claim 1, wherein said linearly movable barrel comprises a front wall portion positioned in front of said barrier blade in said optical axis direction, and
   wherein said front wall portion covers the front of said forward-projecting portion that is relatively moved to a position so as to intersect said operating plane in said accommodated state of said lens barrel.

4. The lens barrier mechanism according to claim 1, wherein part of said cam groove is formed on said forward-projecting portion of said cam ring.

5. The lens barrier mechanism according to claim 1, wherein a plurality of said forward-projecting portions are formed at different positions in a circumferential direction of said cam ring, and
   wherein all of said forward-projecting portions are positioned outside said range of opening/shutting operation of said barrier blade in said operating plane when said lens barrel is in said accommodated state.

6. The lens barrier mechanism according to claim 1, wherein said barrier drive mechanism comprises:
   a shutting-direction biasing spring which biases said barrier blade in a direction to close said opening at front of said linearly movable barrel; and
   a barrier drive ring which is supported by said linearly movable barrel to be rotatable in a plane substantially parallel to said operating plane of said barrier blade,
   wherein said barrier drive ring opens and holds said barrier blade against a biasing force of said shutting-direction biasing spring when said lens barrel is in said ready-to-photograph state, and
   wherein, when said lens barrel moves from said ready-to-photograph state to said accommodated state, said barrier drive ring is pressed and rotated by said forward-projecting portion to thereby release said holding of said barrier blade.

7. The lens barrier mechanism according to claim 5, wherein said range of opening/shutting operation of said barrier blade extends in a radial direction beyond a position of an inner circle defined by an inner periphery of said plurality of forward-projecting portions as viewed along said optical axis.

8. The lens barrier mechanism according to claim 6, wherein said barrier drive mechanism further comprises an extension spring which biases said barrier drive ring in a direction to open said barrier blade, a spring force of said extension spring being greater than that of said shutting-direction biasing spring.

9. The lens barrier mechanism according to claim 5, wherein a plurality of said cam grooves which correspond in number to said plurality of forward-projecting portions are partly formed on said plurality of forward-projecting portions, respectively.

* * * * *